United States Patent
Bolin et al.

(10) Patent No.: US 9,479,267 B1
(45) Date of Patent: Oct. 25, 2016

(54) DEVICE CONTACT AVOIDANCE FOR BODY AREA NETWORK

(71) Applicant: Sony Mobile Communications Inc., Tokyo (JP)

(72) Inventors: Thomas Bolin, Lund (SE); Magnus Midholt, Lund (SE); Ola Thorn, Limhamn (SE); Erik Bengtsson, Eslov (SE); Henrik Bengtsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/721,358

(22) Filed: May 26, 2015

Related U.S. Application Data

(63) Continuation of application No. PCT/IB2015/052335, filed on Mar. 30, 2015.

(51) Int. Cl.
| | |
|---|---|
| *H04B 5/00* | (2006.01) |
| *H04B 7/00* | (2006.01) |
| *H04B 13/00* | (2006.01) |
| *H04L 5/00* | (2006.01) |
| *H04L 29/06* | (2006.01) |

(52) U.S. Cl.
CPC ........... *H04B 13/005* (2013.01); *H04L 5/0048* (2013.01); *H04L 63/0492* (2013.01)

(58) Field of Classification Search
CPC .................................................. H04B 13/005
USPC .............................................. 455/41.1–41.3
See application file for complete search history.

(56) References Cited

U.S. PATENT DOCUMENTS

| | | | |
|---|---|---|---|
| 2006/0052056 A1 | 3/2006 | Park et al. | |
| 2009/0309751 A1* | 12/2009 | Kano | H04B 13/005 340/4.4 |
| 2010/0330910 A1* | 12/2010 | Yan | H04B 5/0031 455/41.2 |

(Continued)

FOREIGN PATENT DOCUMENTS

| | | |
|---|---|---|
| WO | 2014/161912 | 10/2014 |

OTHER PUBLICATIONS

Rajeet K. Patro, "Samsung MAC Proposal for IEEE 802.15 TG6", IEEE, May 26, 2009, XP017666877.

(Continued)

*Primary Examiner* — Simon Nguyen
(74) *Attorney, Agent, or Firm* — Tucker Ellis LLP

(57) ABSTRACT

A device and a method provide for transmitting, via a communication interface operating in a low frequency body area network (BAN) communication mode, a low frequency, on-body signal to another device; determining whether to continue a BAN communication with the other device based on whether an on-body BAN signal is received from the other device that is responsive to the low frequency, on-body signal; and switching the communication interface to a high frequency BAN communication mode based on a determination that the on-body BAN signal is received, wherein the high frequency BAN communication mode configures the communication interface to transmit and receive an on-body signal within a frequency band different from a frequency band of the low frequency BAN communication mode.

15 Claims, 9 Drawing Sheets

(56) References Cited

U.S. PATENT DOCUMENTS

| | | | | |
|---|---|---|---|---|
| 2012/0126944 A1* | 5/2012 | Ueno | ............... | G07C 9/00158 340/5.82 |
| 2013/0141384 A1* | 6/2013 | Mukherjee | ............ | G06F 3/0416 345/174 |
| 2014/0236077 A1* | 8/2014 | Robertson | ............ | A61B 5/0006 604/66 |
| 2014/0273829 A1* | 9/2014 | Chandra | ............. | H04B 13/005 455/41.1 |
| 2015/0093988 A1* | 4/2015 | Konanur | ............. | H04B 5/0031 455/41.1 |
| 2015/0099468 A1* | 4/2015 | Kamide | ............... | H04B 13/005 455/41.2 |
| 2015/0358088 A1* | 12/2015 | Eim | .................... | H04B 13/005 455/418 |
| 2016/0028492 A1* | 1/2016 | Triantafillou | ......... | H04W 84/18 726/3 |
| 2016/0029422 A1* | 1/2016 | Thorn | ................. | H04W 76/023 455/39 |
| 2016/0050516 A1* | 2/2016 | Visweswara | ......... | H04B 13/005 455/41.2 |
| 2016/0070899 A1* | 3/2016 | Vemula | .................. | G06F 21/32 726/19 |

OTHER PUBLICATIONS

International Search Report and Written Opinion for corresponding International Application No. PCT/IB2015/052335 dated Sep. 10, 2015.

IEEE, "IEEE Standard for Local and metropolitan area networks—Part 15.6: Wireless Body Area Networks", IEEE Std 302.15.6-2012, Feb. 29, 2012.

Ecma International, "Close Capacitive Coupling Communication Physical Layer (CCCC PHY)", 1st Edition, Standard ECMA-401, Dec. 2011.

* cited by examiner

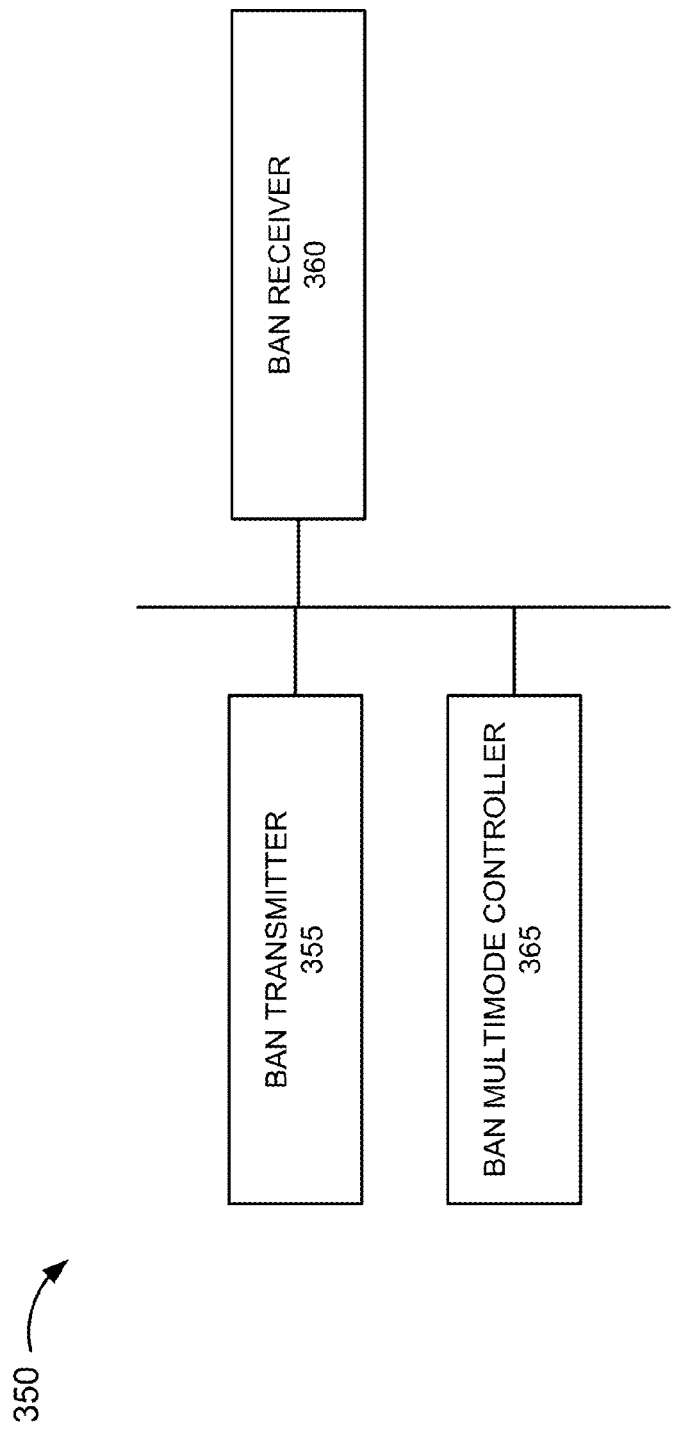

DEVICE CONTACT AVOIDANCE FOR BODY AREA NETWORK

REFERENCE TO RELATED APPLICATION

This application is a continuation of copending International Application PCT/IB2015/052335, with an international filing date of Mar. 30, 2015.

BACKGROUND

Body Area Network (BAN) is an emerging technology that allows different devices to communicate with one another, such as devices located on the user, separate devices between multiple users, or a user touching another device.

Body-coupled communication (BCC) is a communication in which the human body serves as a transmission medium. For example, a communication signal may travel on, proximate to, or in the human body. According to one known approach, this may be accomplished by creating a surface charge on the human body that causes an electric current and formation and re-orientation of electric dipoles of human tissues. A transmitter is used to transmit a body-coupled signal and a receiver is used to receive the body-coupled signal. There are a number of advantages related to body-coupled communication compared to other forms of communication, such as power usage, security, resource utilization, etc.

SUMMARY

According to one aspect, a method may comprise transmitting, by a first device operating in a low frequency body area network (BAN) communication mode, a low frequency, on-body signal to a second device; determining, by the first device, whether to continue a BAN communication with the second device based on whether an on-body BAN signal is received from the second device that is responsive to the low-frequency, on-body signal; and operating, by the first device, in a high frequency BAN communication mode, based on determining that the on-body BAN signal is received, wherein operating in the high frequency BAN communication mode configures the first device to transmit and receive an on-body signal within a frequency band different from a frequency band of the low frequency BAN communication mode.

According to another aspect, a device may comprise a communication interface, wherein the communication interface is configured to operate in a low frequency body area network (BAN) communication mode and a high frequency BAN communication mode; a memory, wherein the memory stores instructions; and a processor, wherein the processor is configured to execute the instructions to transmit, via the communication interface operating in the low frequency BAN communication mode, a low frequency, on-body signal to another device; determine whether to continue a BAN communication with the other device based on whether an on-body BAN signal is received from the other device that is responsive to the low frequency, on-body signal; and switch the communication interface to the high frequency BAN communication mode based on a determination that the signal is received, wherein the high frequency BAN communication mode configures the communication interface to transmit and receive an on-body signal within a frequency band different from a frequency band of the low frequency BAN communication mode.

DESCRIPTION OF THE DRAWINGS

The accompanying drawings, which are incorporated in and constitute a part of this specification, illustrate exemplary embodiments described herein and, together with the description, explain these exemplary embodiments.

FIG. 3B illustrates exemplary components of a multimode BAN communication system of the user device;

DETAILED DESCRIPTION

Figure 1:
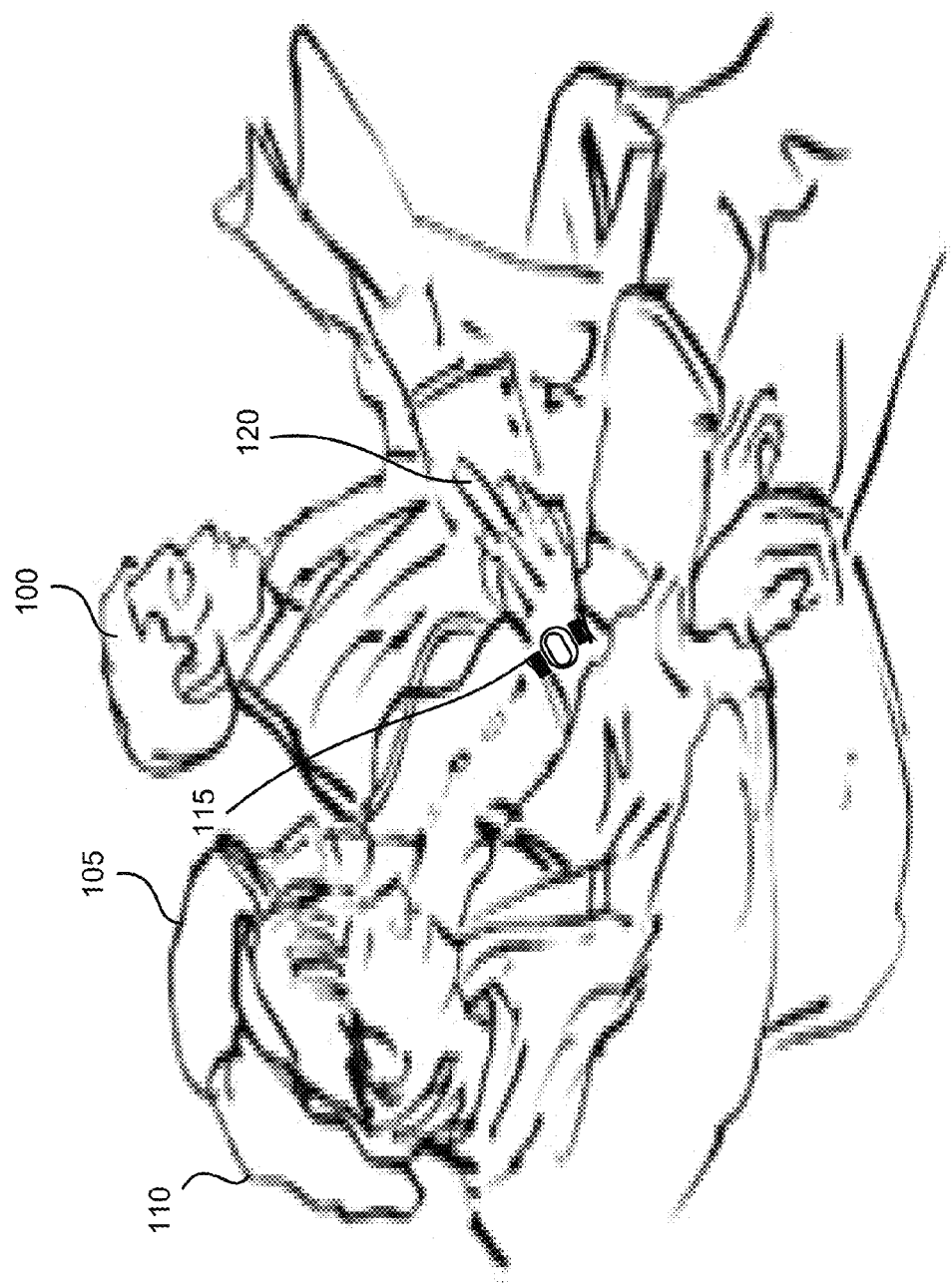
FIG. 1 illustrates an exemplary use case in which an exemplary embodiment of a multimode BAN communication device may be implemented.

The following detailed description refers to the accompanying drawings. The same reference numbers in different drawings may identify the same or similar elements.

Body area network (BAN) (also known as wireless body area network (WBAN), body sensor network (BSN), and body area wireless sensor network (BAWSN)) is an emerging technology that is expected to proliferate in the coming years. Generally, a BAN is a system of devices, which may operate on, in, or proximate to a person's body (or other living thing) that permits communication of data amongst the devices. The BAN may comprise various types of devices, such as a wearable device, an implanted device, a mobile device, etc., and may serve various applications including consumer-related, medical-related, military-related, sports and recreational-related, etc.

One problem with BAN technology is to enable communication that yields the best result. For example, a device of a BAN can transmit a high frequency signal, which enables a high data rate, to carry data. However, the high frequency signal tends to suffer from over-the-air leakage. In some circumstances, such as when the user is in an elevator, using public transportation, or in some other environment where the user is very close to another person or many people, signal leakage may not be desirable. That is, for example, the device may initiate contact with an unintended device that is proximate to the user because of the leaked signal when trying to establish a BAN session with a target device. Alternatively, subsequent to establishment of the BAN session between the device and the target device, an unintended device may come into range during the BAN session. Aside from the potential exposure of sensitive data, the BAN may also not operate to the full benefit of the user.

While over-the-air signal leakage may be regulated to some degree by way of controlling the power of the high frequency signal being transmitted, there are drawbacks. For example, a device that transmits a high frequency signal at a low power may reduce the radiated signal through the air. However, the high frequency signal may not propagate well over the user's body. In this regard, the distance to which the high frequency, low power signal propagates may be limited. Thus, the high frequency, low power signal may not propagate far enough to reach the intended device of the BAN or other target device.

In view of the foregoing problems and disadvantages, an exemplary embodiment is described that introduces a device of a BAN that provides multimode BAN communication. According to an exemplary embodiment, the device operates in both a low frequency mode and a high frequency mode. By way of example, when operating in the low frequency mode, the device transmits an on-body signal at a low frequency to initiate contact with a target device or verify an on-body connection. Since the on-body signal is transmitted at the low frequency, the likelihood of over-the-air leakage is minimized. According to an exemplary embodiment, the low frequency, on-body signal carries data. For example, the data may include a "Hello" message or a request to initiate contact. The request may include a device identifier (e.g., source device identifier and/or destination device identifier), a BAN identifier, and/or a type of BAN communication (e.g., an on-body communication flag), etc. In this way, the data included in the request may provide a basis for an unintended device to ignore a low frequency signal. By way of example, the on-body communication flag may indicate that the low frequency, on-body signal is intended as an on-body communication (versus an over-the-air BAN communication or other form of BAN communication). According to an exemplary implementation, when an unintended device receives the low frequency, on-body signal, the unintended device may ignore the low frequency, on-body signal based on the flag and receiving the low frequency signal as an over-the-air signal. Additionally, or alternatively, the unintended device may ignore the low frequency, on-body signal based on other types of data included in the request (e.g., the BAN identifier, etc.). Additionally, or alternatively, according to other examples, the data may include a key (e.g., security key, a secret key, a password, etc.) or any other configurable data string. According to another exemplary embodiment, the low frequency, on-body signal does not carry data.

According to an exemplary embodiment, when a target device receives the low frequency, on-body signal, the target device operates in the low frequency mode and transmits a low frequency, on-body signal. According to an exemplary embodiment, the low frequency signal carries data. For example, the data may include a "Hello" message or a response (e.g., an acknowledgement (ACK), etc.). According to other examples, the data may indicate any other configurable data string. For example, if the device is not a target device, the data may include a device identifier of the device, a BAN identifier that indicates a (different) BAN to which the device belongs, and/or a negative acknowledgment (NACK) that indicates the device is an incorrect or unintended target device. According to another exemplary embodiment, the low frequency, on-body signal does not carry data. According to such embodiments, the exchange of low frequency, on-body signals between the device and the target device, whether such low frequency, on-body signals carry data or not, provide an indication to each device that an over-the-body connection (e.g., body-coupled communication, on-body) is established or verified as opposed to an over-the-air connection or other type of BAN communication. Additionally, or alternatively, the exchange of low frequency, on-body signals may indicate whether a session with the intended target device has been established.

According to yet another exemplary, when the target device receives the low frequency, on-body signal, the target device operates in a high frequency mode and transmits a high frequency, on-body signal. According to an exemplary embodiment, the high frequency, on-body signal carries data. For example, the data may be data pertaining to the application of the BAN (e.g., consumer-related, medical-related, etc.).

According to an exemplary embodiment, when the device receives either the low frequency, on-body signal or the high frequency, on-body signal from the target device, the device also operates in the high frequency mode.

According to an exemplary embodiment, the low frequency, on-body signal can be a particular frequency or fall within a particular band of frequencies, as described herein. Additionally, the low frequency, on-body signal can be transmitted at a particular power or fall within a particular range of power, as described herein. According to an exemplary embodiment, the high frequency, on-body signal can be a particular frequency or fall within a particular band of frequencies, as described herein. Additionally, the high frequency, on-body signal can be transmitted at a particular power or fall within a particular range of power, as described herein.

According to an exemplary embodiment, as described above, when the device operates in the low frequency mode and transmits a low frequency, on-body signal to initiate contact, the low frequency, on-body signal is a first or an initial signal to establish contact or a BAN session.

According to another exemplary embodiment, the device and/or the target transmits a low frequency, on-body signal subsequent to establishment of contact or the BAN session. For example, according to an exemplary implementation, the device and/or the target device have exchanged one or multiple on-body signals (e.g. high frequency signals) while operating in the high frequency mode. Thereafter, device and/or target device may switch to the low frequency mode and transmit a low frequency, on-body signal. For example, according to an exemplary implementation, the device and the target device agree to test or verify the on-body connection. In the event that the on-body connection is verified, the device and the target device switch back to the high-frequency mode. In the event that the on-body connection is not verified, the device and/or target device may cease communication. Alternatively, the device and/or the target device may enter a back-off period and attempt to initiate a BAN session after expiration of the back-off period. As described further below, various criteria may be implemented to serve as a triggering event to verify or test the on-body connection subsequent to establishment of the BAN session. The low frequency, on-body signal transmitted subsequent to the establishment of contact with the target device or the BAN session may or may not carry data.

According to the embodiment of on-body connection verification, the device may or may not have established contact or the BAN session by way of transmitting a low frequency, on-body signal. That is, according to one implementation, the device and the target device establish an on-body connection without transmitting a low frequency, on-body signal, but rather one or multiple high-frequency, on-body signal(s). Thereafter, subsequent to the establishment of contact or the BAN session, the device and/or target device transmit a low frequency, on-body signal to test or verify the on-body connection. According to another implementation, the device and the target device establish contact or the BAN session by way of the device or the device and the target device transmitting low frequency, on-body signals. Thereafter, subsequent to the establishment of contact or the BAN session, the device and/or target device transmit a low frequency, on-body signal to test or verify the on-body connection.

FIG. 1 illustrates an exemplary use case in which an exemplary embodiment of a multi-mode BAN communication device may be implemented. Referring to FIG. 1, assume that a person 100, a person 105, and a person 110 are passengers on a subway. Person 105 decides to check messages on his or her mobile device 120. However, mobile device 120 is in a locked state due to inactivity. Based on receiving an input from person 105, mobile device 120 determines to operate in a low frequency mode for an on-body BAN communication and transmits a low frequency, on-body signal, which is intended to be received by a wrist-worn device 115 worn by person 105. According to this example, the low frequency, on-body signal carries data (e.g., a request to connect). Wrist-worn device 115 receives the low frequency, on-body signal and, in response, operates in a low frequency mode for BAN communication. Wrist-worn device 115 transmits a low frequency, on-body signal that carries a response (e.g., an acknowledgement) and switches to a high frequency mode. Mobile device 120 receives the low frequency, on-body signal from wrist-worn device 115 and switches to a high frequency mode of operation. Thereafter, wrist-worn device 115 transmits a high frequency, on-body signal that carries a personal identification code (PIN). Mobile device 120 receives the high frequency, on-body signal and unlocks mobile device 120 based on the received PIN. After mobile phone 120 unlocks, person 105 navigates to an application to check recently received messages.

Figure 2A:
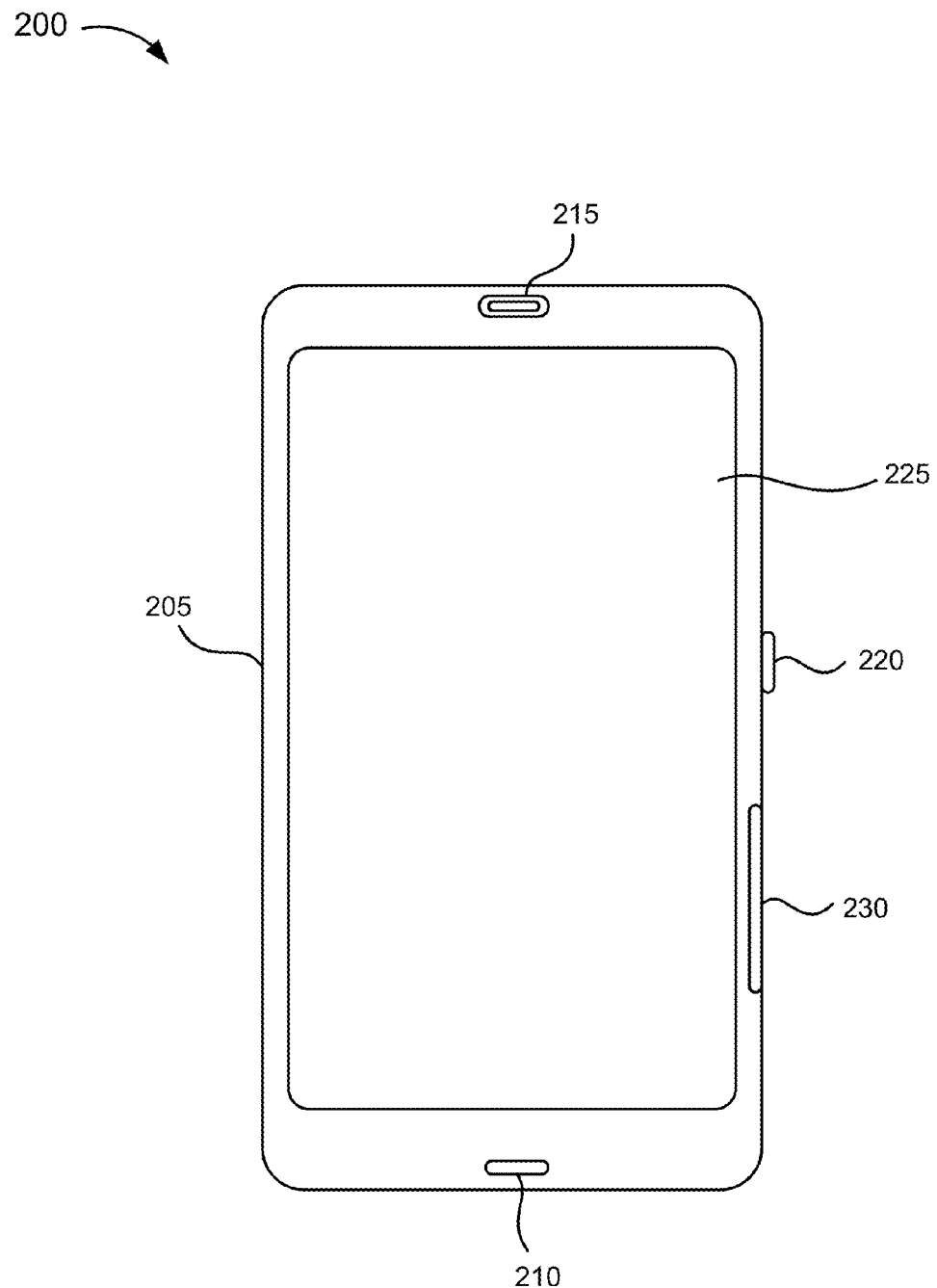
FIGS. 2A and 2B illustrate exemplary user devices in which exemplary embodiments of a multimode BAN communication system may be implemented.

FIG. 2A illustrates an exemplary user device 200 in which exemplary embodiments of a multimode BAN communication system may be implemented. While illustratively speaking, user device 200 may be representative of, for example, a smartphone, a cellphone, or a personal digital assistant (PDA). User device 200 may be implemented as various other types of mobile devices. For example, user device 200 may take the form of a tablet device, a data organizer, a Web-access device, a palmtop device, a netbook, a gaming device, a location-aware device, a music playing device, a wearable device (e.g., a ring, a necklace, a watch, eyeglasses, a bracelet, etc.), or some other type of mobile device (e.g., a vehicular communication system, etc.). Alternatively, user device 200 may be implemented as a non-mobile device (e.g., a kiosk, a vending machine, a point-of-payment device, etc.) or any other form of an electronic device (e.g., a medical device, etc).

As illustrated in FIG. 2A, user device 200 comprises a housing 205, a microphone 210, a speaker 215, a button 220, a display 225, and a BAN contact 230. BAN contact 230 may include a conductive portion integrated within housing 205 coupled internally to a BAN antenna, which in turn is coupled to a BAN communication system, as described below. As shown in FIG. 2A, BAN contact 230 may be provided in a region of user device 200 that typically contacts a user during use of user device 200. Further, BAN contact 230 may be distributed in multiple area of user device 200 so as to ensure that at least one BAN contact 230 is in contact with the user, when the user possesses user device 200. BAN contact 230 may include or communicate with a body sensor and a BAN electrode to determine on-body contact and transmit signals to/from the body of a user of user device 200.

Figure 2B:
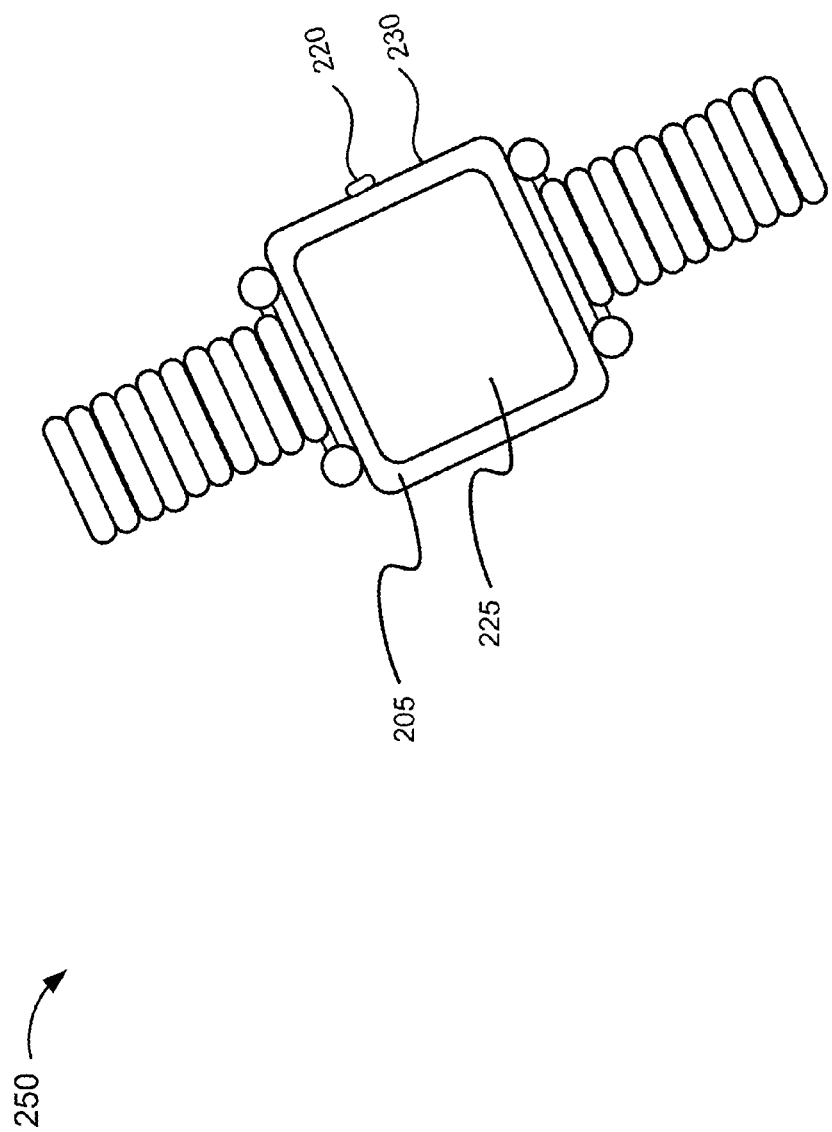

According to other embodiments, user device 200 may comprise fewer components, additional components, different components, and/or a different arrangement of components than those illustrated in FIG. 2A and described herein. For example, user device 200 may include a port (e.g., a headphone port, a Universal Serial Bus (USB) port, a High Definition Multimedia Interface (HDMI) port, or some other type of input port and/or output port, etc.), a camera, a keypad, a keyboard, a biometric reader (e.g., retina, etc), etc. FIG. 2B is a diagram illustrating another exemplary user device 250 in which exemplary embodiments described herein may be implemented. As illustrated, user device 250 is representative of a wrist-worn device and comprises components similar to those previously described in relation to user device 200, such as housing 205, button 220, display 225, and BAN contact 230. For purposes of description, user device 200 and user device 250 will be referenced simply as "user device 200."

Figure 3A:
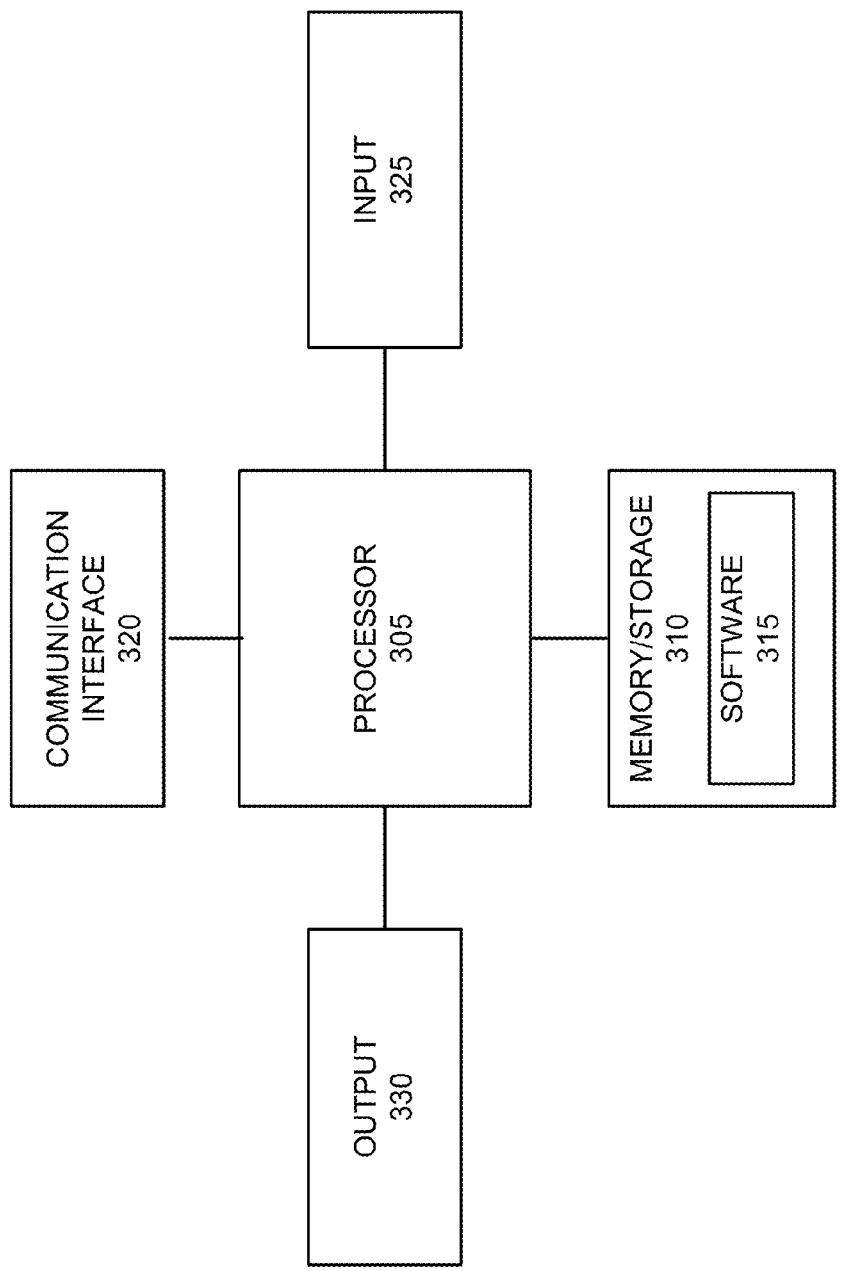
FIG. 3A illustrates exemplary components of the user devices of FIGS. 2A and 2B.

FIG. 3A illustrates exemplary components of user device 200 depicted in the previous figures and described herein. As illustrated, according to an exemplary embodiment, user device 200 comprises a processor 305, memory/storage 310, software 315, a communication interface 320, an input 325, and an output 330. According to other embodiments, user device 200 may comprise fewer components, additional components, different components, and/or a different arrangement of components than those illustrated in FIG. 3A and described herein.

Processor 305 comprises one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may comprise one or multiple memories (e.g., memory/storage 310), etc.

Processor 305 controls the overall operation or a portion of operation(s) performed by user device 200. Processor 305 performs one or multiple operations based on an operating system and/or various applications or programs (e.g., software 315). Processor 305 may access instructions from memory/storage 310, from other components of user device 200, and/or from a source external to user device 200 (e.g., a network, another device, etc.).

Memory/storage 310 comprises one or multiple memories and/or one or multiple other types of storage mediums. For example, memory/storage 310 may comprise one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may comprise a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may comprise drives for reading from and writing to the storage medium.

Software 315 comprises an application or a program that provides a function and/or a process. Software 315 may comprise firmware. By way of example, software 315 may comprise a telephone application, a multi-media application, an e-mail application, a contacts application, a calendar application, an instant messaging application, a web browsing application, a location-based application (e.g., a Global Positioning System (GPS)-based application, etc.), a handwriting application, a drawing application, a camera application, a medical-related application, etc. According to an exemplary embodiment, software 315 comprises a BAN communication system that provides multimode operation. The BAN communication system may comprise a dedicated processor/circuitry to execute software 315 versus, for example, relying on a main central processing unit (CPU) of user device 200 to execute software 315.

Communication interface 320 permits user device 200 to communicate with other devices, networks, systems, etc. Communication interface 320 may comprise one or multiple wireless interfaces and/or wired interfaces. Communication interface 320 may comprise one or multiple transmitters, receivers, and/or transceivers. Communication interface 320 operates according to one or multiple protocols, a communication standard, and/or the like. For example, communication interface 320 may include transmitters, receivers, and/or transceivers to enable communication via various protocols and/or communication standards, such as Bluetooth®, near field communication (NFC), Wi-Fi, as well as long range wireless communications, such as 3G, LTE (long term evolution), etc.

According to an exemplary embodiment, communication interface 320 comprises a BAN communication system. An exemplary BAN communication system that provides multimode operation is described below and is illustrated in FIG. 3B.

Input 325 permits an input into user device 200. For example, input 325 may comprise a keypad, a display (e.g., display 225), a touch pad, a button, a switch, a microphone (e.g., microphone 210), an input port, a knob, and/or some other type of input component. Output 330 permits user device 200 to provide an output. For example, output 330 may comprise a display (e.g., display 225), a speaker (e.g., speakers 215), a light emitting diode (LED), an output port, a vibratory mechanism, or some other type of output component.

User device 200 may perform a process and/or a function in response to processor 305 executing software 315 stored by memory/storage 310. By way of example, instructions may be read into memory/storage 310 from another memory/storage 310 or read into memory/storage 310 from another device via communication interface 320. The instructions stored by memory/storage 310 causes processor 305 to perform the process or the function. Alternatively, user device 200 may perform a process or a function based on the operation of hardware (processor 305, etc.).

As previously described, according to an exemplary embodiment, user device 200 comprises a BAN communication system that provides multimode operation. A description of exemplary components of the multimode BAN communication system is described further below.

FIG. 3B illustrates exemplary components of a BAN communication system 350 that provides multimode operation. As illustrated, according to an exemplary embodiment, BAN communication system 350 comprises a BAN transmitter 355, a BAN receiver 360, and a BAN multimode controller 365. According to other embodiments, BAN communication system 350 may include additional components, different components, fewer components, and/or a different arrangement of components than those illustrated in FIG. 3B and described herein. For example, BAN transmitter 355 and BAN receiver 360 may be implemented as a transceiver. Further, in other embodiments, each mode may include a separate transceiver or transmitter and receiver pair. The connections between the components are exemplary. According to an exemplary implementation, communication interface 320 includes BAN communication system 350. According to an exemplary embodiment, BAN communication system 350 is communicatively coupled to BAN contact 230.

While BAN technology may be used to communicate on-body, off-body (e.g., air), through body, in-body, and body-to-body (e.g., interbody), the description of BAN communication system 350 pertains to on-body communication. However, although not specifically described, BAN communication system 350 may also be configured for off-body, interbody, etc., communication in which signal characteristics (e.g., frequency, power, modulation, etc.) can be tailored for the particular type of BAN communication. In view of the characteristics of on-body communication, BAN transmitter 355 and BAN receiver 360 or a contact conductively coupled thereto may be brought into contact with a surface of the user's skin or sufficiently close to the user's skin (e.g., <2 centimeters). On-body signal propagation may occur by way of a creeping wave and a surface wave. BAN communication system 350 may use a well-known or a conventional protocol stack (e.g., physical (PHY), media access control (MAC), etc.).

BAN transmitter 355 comprises one or multiple transmitters. For example, according to an exemplary implementation, BAN transmitter 355 may comprise a dedicated transmitter for each mode of BAN operation (e.g., a low BAN communication mode and a high BAN communication mode). Alternatively, BAN transmitter 355 may comprise a single transmitter that operates in both modes of operation. BAN transmitter 355 can transmit an on-body signal at a low frequency and a high frequency. According to an exemplary implementation, when in a low BAN communication mode, BAN transmitter 355 can transmit a low frequency, on-body signal at a frequency within a band of low frequencies. For example, the band of low frequencies may range from 100 kilohertz (kHz) through 1 megahertz (MHz) or any sub-range of low frequencies within the 100 kHz through 1 MHz range. In view of the low frequency at which the on-body signal is transmitted, according to an exemplary implementation, BAN transmitter 355 transmits the low frequency, on-body signal at a power that is greater than when BAN communication system 350 operates in the high BAN communication mode. That is, due to the characteristics of a low frequency, on-body signal and path loss considerations, the low frequency, on-body signal may exhibit greater attenuation relative to an on-body signal transmitted at a high frequency. According to an exemplary implementation, BAN transmitter 355 can transmit a low frequency, on-body signal within a power from 0.1 milliwatt (mW) through 50 mW or any sub-range of power within 0.1 mW through 50 mW. As previously described, when BAN communication system 350 operates in the low BAN communication mode, BAN transmitter 355 may transmit a low frequency, on-body signal within a sub-range of power, which is higher than a sub-range for a high-frequency, on-body signal. For example, when BAN communication system 350 operates in the low BAN communication mode, BAN transmitter 355 may transmit the low frequency, on-body signal within a transmit power ranging between 10-50 mW or any sub-range within that range. Conversely, when BAN communication system 350 operates in the high BAN communication mode, BAN transmitter 355 may transmit the high frequency, on-body signal within a transmit power ranging between 0.1-10 mW or any sub-range within that range.

According to an exemplary implementation, when in a high BAN communication mode, BAN transmitter 355 can transmit a high frequency, on-body signal at a frequency within a band of high frequencies. For example, the band of high frequencies may range from 1 MHz through 50 MHz or any sub-range of high frequencies within the 1 MHz through 50 MHz range. In view of the high frequency at which the on-body signal is transmitted, according to an exemplary implementation, BAN transmitter 355 transmits the high frequency, on-body signal at a power that is less than when BAN communication system 350 operates in the low BAN communication mode. According to an exemplary implementation, BAN transmitter 355 can transmit high frequency signal within a power from 0.1 mW through 50 mW or any sub-range of power within 0.1 mW through 50 mW. Although not specifically illustrated, BAN transmitter 355 may include other signal processing components, such as an amplifier, a modulator, a filter, an error encoder, etc.

BAN receiver 360 comprises one or multiple receivers. For example, according to an exemplary implementation, BAN receiver 360 may comprise a dedicated receiver for each mode of BAN operation. Alternatively, BAN receiver 360 may comprise a single receiver that operates in both modes of operation. BAN receiver 360 can receive an on-body signal at a low frequency and a high frequency. According to an exemplary implementation, when in a low BAN communication mode, BAN receiver 360 can receive a low frequency, on-body signal at a frequency within a band of low frequencies that are comparable to BAN transmitter 355. For example, the band of low frequencies may range from 100 kHz through 1 MHz or any sub-range of low frequencies within the 100 kHz through 1 MHz range.

According to an exemplary implementation, when in a high BAN communication mode, BAN receiver 360 can receive a high frequency, on-body signal at a frequency within a band of high frequencies that are comparable to BAN transmitter 355. For example, the band of high frequencies may range from 1 MHz through 50 MHz or any sub-range of high frequencies within the 1 MHz through 50 MHz range. Although not specifically illustrated, BAN receiver 360 may include other signal processing components, such as an amplifier, a demodulator, a filter, an error decoder, etc.

BAN multimode controller 365 comprises logic to manage the BAN mode in which BAN communication system 350 operates. For example, BAN multimode controller 365 controls when BAN communication system 350 operates in a low BAN communication mode and when BAN communication system 350 operates in a high BAN communication mode. According to an exemplary embodiment, BAN multimode controller 365 causes BAN transmitter 355 to operate in the low BAN communication mode when a first or initial signal is transmitted to an intended target device to establish a BAN session. For example, referring back to the example of FIG. 1, mobile device 120 operates in a low BAN communication mode when transmitting the initial signal to wrist-worn device 115. Similarly, wrist-worn device 115 operates in a low BAN communication mode when transmitting the initial signal to mobile device 120.

According to another exemplary embodiment, BAN multimode controller 365 causes BAN transmitter 355 to operate in the low BAN communication mode subsequent to establishment of contact or the BAN session with the intended target device. For example, the device or the target device may determine to verify or test the on-body connection with the other device with which the device is communicating during the BAN session. As previously described, various criteria may be implemented to serve as a triggering event to verify or test the on-body connection subsequent to establishment of the BAN session. By way of example, the triggering event may be time-based. For example, the device or the target device may seek verification based on a timer mechanism. The timer mechanism may indicate a periodicity (e.g., every 5 minutes or some other configurable time period) at which verification is sought during the BAN session. According to another example, the triggering event may be based on the quality of on-body signals received. For example, the device or the target device may determine that the on-body connection is poor based on the number of errors included in received on-body signal(s), the number of retransmissions occurring during the BAN session, and/or the characteristic(s) of on-body signal(s) being received (e.g., in terms of power, etc.), or some other configurable triggering event.

According to another exemplary embodiment, BAN multimode controller 365 causes BAN transmitter 355 to operate in the high BAN communication mode in response to receiving an initial low frequency, on-body signal. For example, when wrist-worn device 115 receives the initial low frequency, on-body signal from mobile device 120 via BAN receiver 360, BAN multimode controller 365 causes BAN transmitter 355 to operate in the high BAN communication mode. By way of further example, in response to receiving a low frequency, on-body signal from mobile device 120, wrist-worn device 115 transmits the PIN via a high frequency, on-body signal to mobile device 120. According to yet another exemplary embodiment, BAN multimode controller 365 causes BAN transmitter 355 to operate in the high BAN communication mode in response to receive a high frequency, on-body signal. For example, when mobile device 120 receives a high frequency, on-body signal via BAN receiver 360 from wrist-worn device 115, mobile device 120 transmits to wrist-worn device 115 a high frequency, on-body signal via BAN transmitter 355. According to yet another exemplary embodiment, BAN multimode controller 365 causes BAN transmitter 355 to operate in the high BAN communication mode in response to determining that the on-body connection has been verified.

According to an exemplary embodiment, BAN multimode controller 365 generates data and/or analyzes data pertaining to on-body BAN communications. BAN multimode controller 365 may store a protocol stack for on-body BAN communication (e.g., multimode, on-body communication).

Figure 4A:
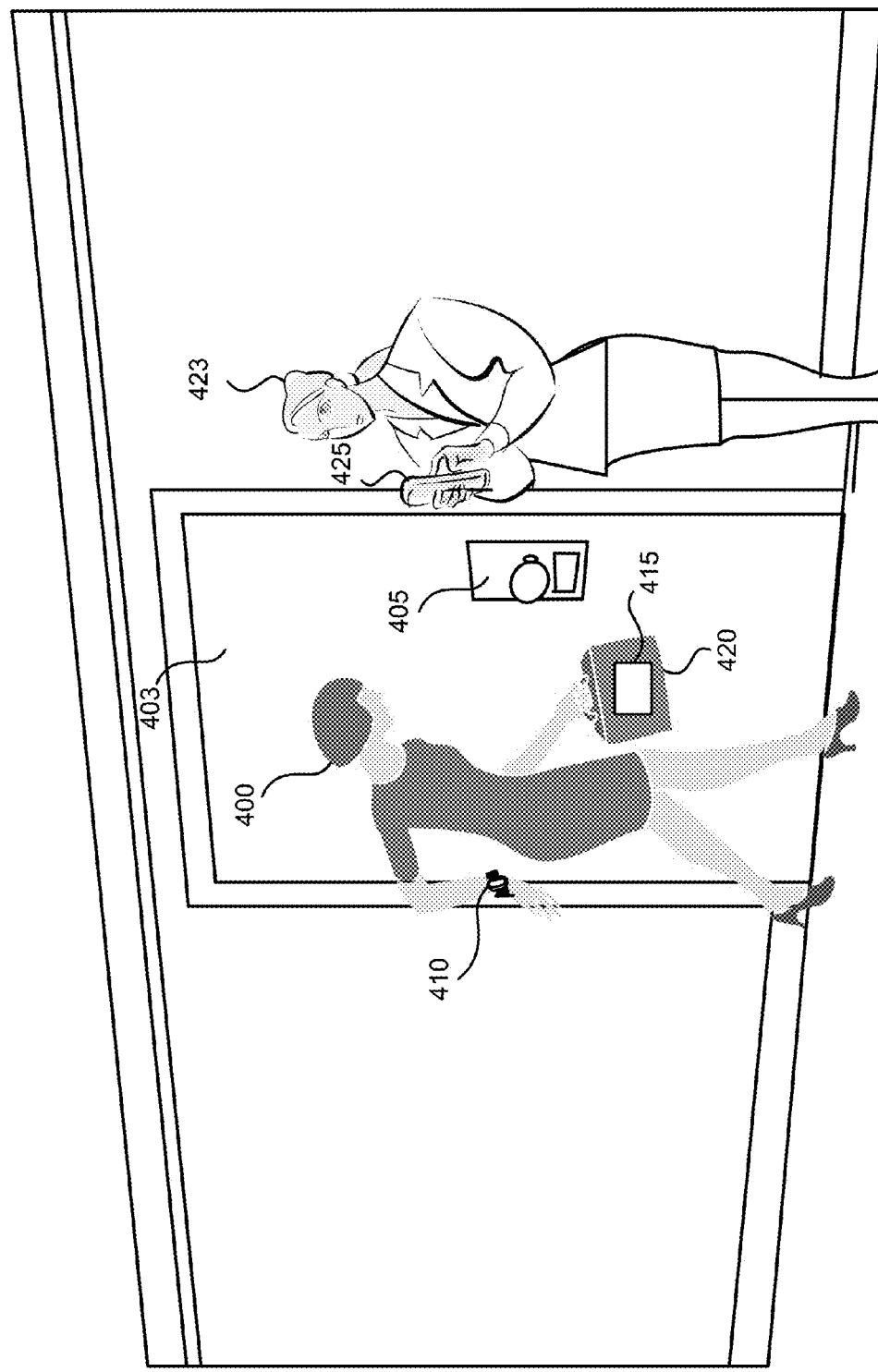
FIGS. 4A and 4B illustrate exemplary use cases pertaining to the multimode BAN communication device.
Figure 4B:
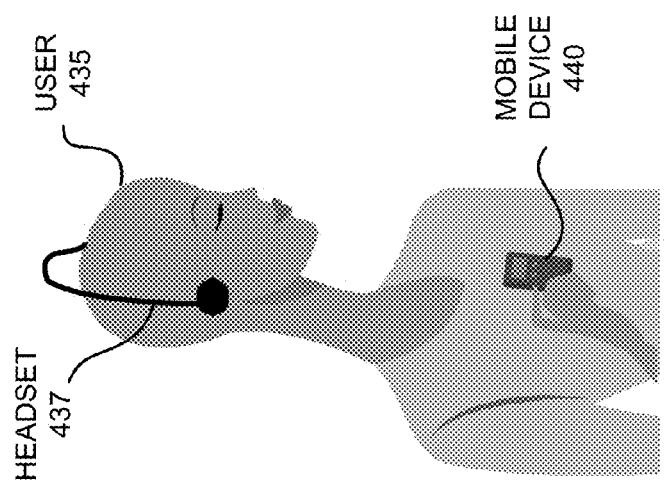

Described below are exemplary use case scenarios that pertain to an exemplary embodiment of a BAN multimode communication device. FIGS. 4A and 4B illustrate exemplary use cases pertaining to the multimode BAN communication device. It may be assumed that each device described in relation to FIGS. 4A and 4B is a multimode BAN communication device. Referring to FIG. 4A, two different use cases scenarios are described. According to a first scenario, assume that a user 400 approaches her house and wishes to enter via a front door 403. According to this example, front door 403 includes an electronic lock 405. As illustrated, user 400 is wearing a wearable device 410 and is carrying a mobile device 415 in a bag 420. As user 400 attempts to open door 403 by grasping electronic lock 405, electronic lock 405 transmits a low frequency, on-body signal without data, which propagates as an on-body communication and is received by wearable device 410. Since electronic lock 405 transmits a low frequency, on-body signal, over-the-air leaking is minimized and mobile device 415 does not receive the low frequency, on-body signal. In response to receiving the low frequency, on-body signal, wearable device 410 transmits a high frequency, on-body signal, which propagates as on on-body communication and carries a passkey to unlock front door 403. Electronic lock 405 receives the passkey and unlocks front door 403.

According to a second scenario, assume that user 400 approaches an office door 403 at her workplace. Office door 403 includes electronic lock 405. A stranger 423 is standing nearby in a hallway and using a mobile device 425. As user 400 attempts to open office door 403 by grasping electronic lock 405, electronic lock 405 transmits a low frequency, on-body signal that carries data, which propagates as an on-body communication and is received by wearable device 410. For example, the data includes a BAN identifier and a flag that indicates that the request is an on-body communication. Since electronic lock 405 transmits a low frequency, on-body signal, over-the-air leaking is minimized and mobile device 425 does not receive the low frequency, on-body signal. In response to receiving the low frequency, on-body signal, wearable device 410 analyzes the received request and determines that wearable device 410 is in communication with an authorized device (i.e., electronic lock 405) based on the BAN identifier and/or the flag. In response, wearable device 410 transmits a high frequency, on-body signal, which propagates as an on-body communication and carries a passkey to unlock office door 403. Electronic lock 405 receives the passkey and unlocks office door 403.

FIG. 4B illustrates another exemplary use case scenario. Assume a user 435 is operating a mobile device 440 and decides to listen to music. User 435 selects a song to play. User 435 puts on a wireless headset 437. Wireless headset 437 detects that a user (i.e., user 435) is wearing headset 437 and, in response to such detection, transmits a low frequency, on-body signal that includes data, which propagates as an on-body communication. For example, the data includes a request to initiate an audio channel. Mobile device 440 receives the request carried by the low frequency, on-body signal. In response, mobile device 440 transmits a low frequency, on-body signal that carries a response (e.g., an acknowledgement). Thereafter, mobile device 440 switches to a high BAN communication mode and transmits a high frequency, on-body signal that carries streaming data corresponding to the song.

Figure 5:
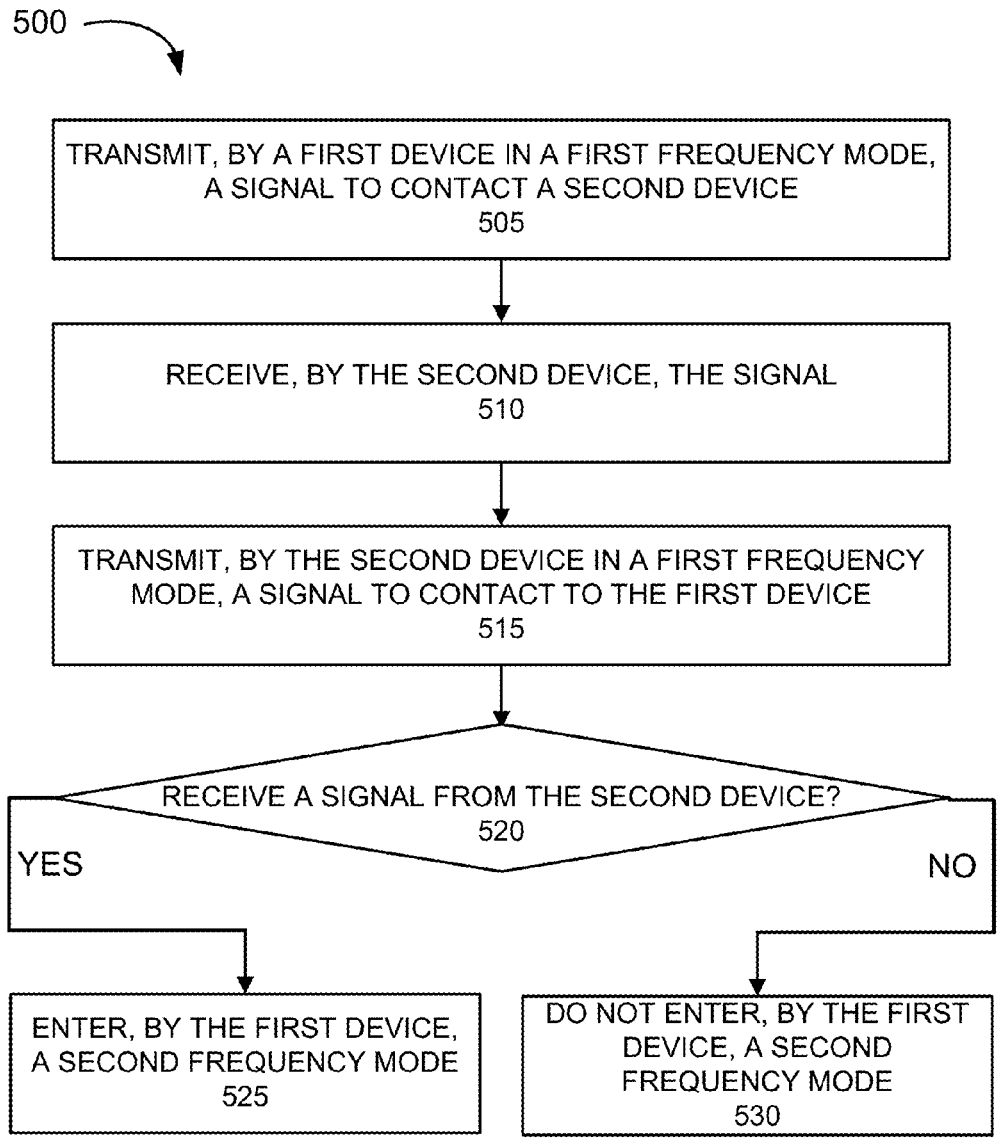
FIG. 5 is a flow diagram illustrating an exemplary process pertaining to an exemplary embodiment of the multimode BAN communication device.

FIG. 5 is a flow diagram illustrating an exemplary process 500 pertaining to a multimode BAN communication device. A step or an act of process 500 may performed by multimode BAN communication system 350 of a BAN communication device. For example, processor 305 may execute software 315 to provide the functionality of BAN multimode controller 365. Additionally, a step or act may be performed by BAN transmitter 355 or BAN receiver 360. With regard to process 500, it may be assumed that a triggering event has occurred to cause a multimode BAN communication to occur.

Process 500 may be performed when multiple BAN communication devices are worn and/or carried by a single user. Additionally, process 500 may be performed according to other environments in which on-body communication between BAN communication devices is performed (e.g., between two users, a user and a BAN communication device not worn or carried by the user, etc.).

Process 500 begins, in block 505, with a signal being transmitted, by a first device in a first frequency mode, to make contact to a second device. For example, BAN multimode controller 365 of a first multimode BAN communication device may receive data indicating to initiate a communication. According to an exemplary embodiment, in response to this indication, BAN multimode controller 365 causes BAN transmitter 355 to transmit a low frequency, on-body signal that does not carry data. According to another exemplary embodiment, BAN transmitter 355 transmits a low frequency, on-body signal that carries data.

In block 510, the signal is received by a second device. For example, the low frequency, on-body signal propagates as an on-body communication. A second multimode BAN communication device receives the low frequency, on-body signal via BAN receiver 360.

In block 515, the second device, while in a first frequency mode, transmits a signal to contact the first device. For example, in response to receiving the low frequency, on-body signal, BAN multimode controller 365 of the second multimode BAN communication device causes BAN transmitter 355 to transmit a low frequency, on-body signal that does not carry data. According to another exemplary embodiment, BAN transmitter 355 transmits a low frequency, on-body signal that carries data.

In block 520, it is determined, by the first device, whether a signal from the second device is received. For example, BAN multimode controller 365 of the first BAN communication device determines whether to continue a BAN communication with the second device based on whether BAN receiver 360 has received a low frequency, on-body signal that is responsive to the previously transmitted low frequency, on-body signal. According to an exemplary implementation, BAN multimode controller 365 may wait a prefigured time window to receive a response.

When it is determined that a signal from the second device is received (block 520-YES), the first device enters a second frequency mode (block 525). For example, when BAN multimode controller 365 determines that a low frequency, on-body signal has been received, BAN multimode controller 365 causes BAN communication system 350 to enter a high BAN communication mode. That is, BAN multimode controller 365 determines to continue the BAN communication with the second device. For example, BAN communication system 350 may transmit and/or receive data in the high BAN communication mode.

When it is determined that a signal is not received from the second device (block 520-NO), the first device does not enter the second frequency mode (block 530). For example, when BAN multimode controller 365 determines that a low frequency, on-body signal has not been received, BAN multimode controller 365 does not cause BAN communication system 350 to enter a high BAN communication mode. For example, BAN multimode controller 365 may determine to discontinue the BAN communication with the second device when the low frequency, on-body signal has not been received. Alternatively, BAN communication system 350 may remain in the low BAN communication mode and attempt another BAN communication (e.g., transmit another low frequency, on-body signal). For example, BAN communication system 350 may wait a preconfigured time period (e.g., a back-off period) before attempting to establish another BAN session.

Although FIG. 5 illustrates an exemplary process 500, according to other embodiments, process 500 may comprise additional operations, fewer operations, and/or different operations than those illustrated in FIG. 5 and described. For example, as previously described, BAN multimode controller 365 may cause BAN communication system 350 to enter the low BAN communication mode subsequent to the BAN session having been established. Thus, for example, in block 505, the first device may transmit a low frequency, on-body signal to the second device to verify the on-body connection. Depending on whether the BAN session was established by way of a low frequency, on-body signal having been transmitted and whether any previous BAN session verifications occurred, the low frequency, on-body signal may or may not be or constitute a "first" or an "initial" low frequency signal. For example, when the BAN session is established by way of transmitting one or multiple high frequency, on-body signals and no previous BAN session verifications occurred, than when the first device transmits a low frequency, on-body signal, such an on-body signal does constitute the "first" or the "initial" low frequency, on-body signal. On the other hand, when the BAN session is established by way of transmitting one or multiple low frequency, on-body signals or a previous BAN session verification occurred, than when the first device transmits a low frequency, on-body signal, such an on-body signal does not constitute the "first" or the "initial" low frequency signal.

Additionally, process 500 may be performed to ensure that on-body communication is occurring between multiple BAN communication devices, regardless of whether the BAN communication devices are worn or carried by the same user.

Turning to yet another exemplary embodiment, as previously described, when a second multimode BAN communication device receives a first or an initial low frequency, on-body signal, BAN communication system 350 operates in a high BAN communication mode. Described below is an exemplary process pertaining to this embodiment.

Figure 6:
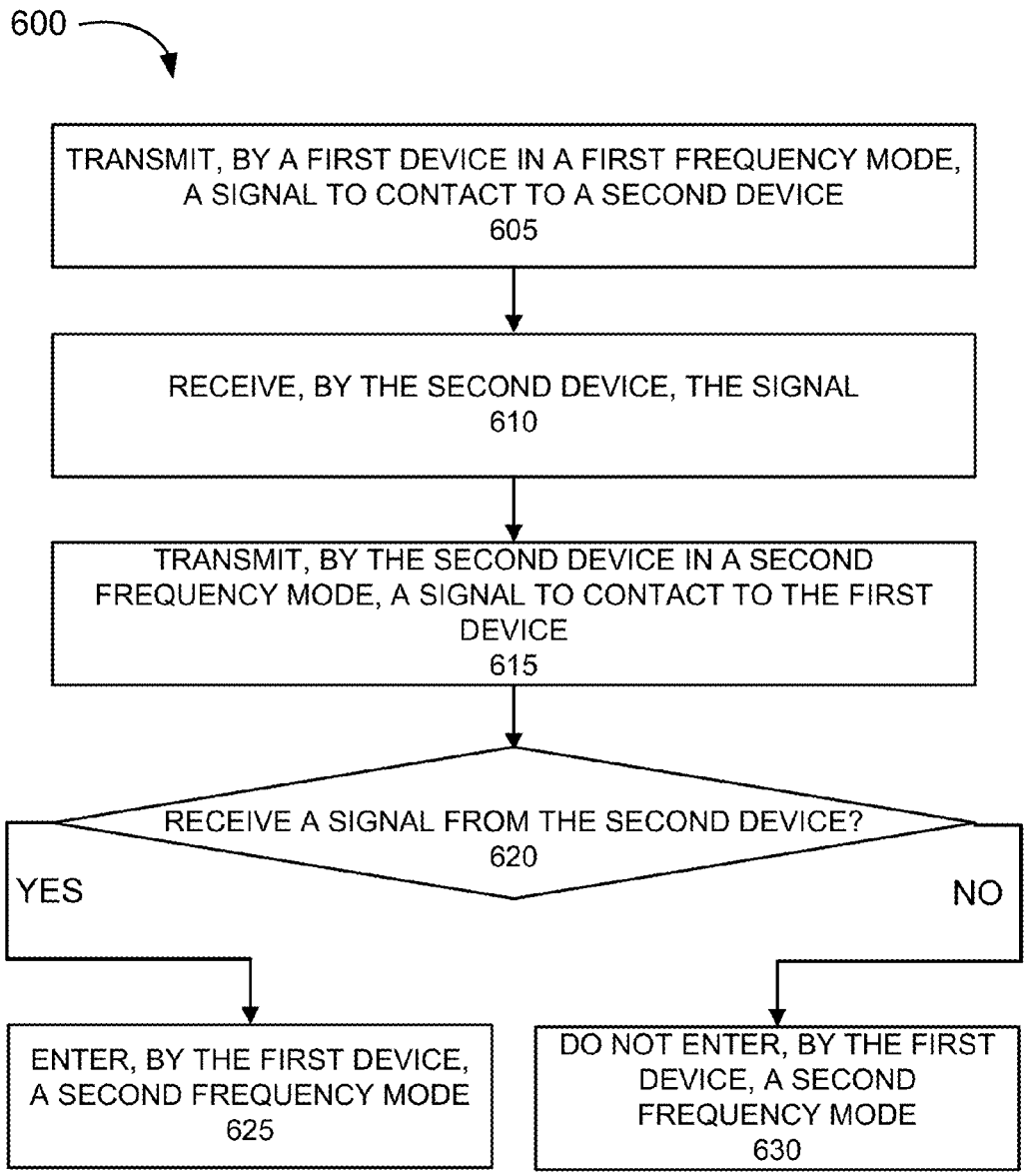
FIG. 6 is a flow diagram illustrating another exemplary process pertaining to the exemplary embodiment of the multimode BAN communication device.

FIG. 6 is a flow diagram illustrating an exemplary process 600 pertaining to a multimode BAN communication device. A step or an act of process 600 may performed by multimode BAN communication system 350 of a BAN communication device. For example, processor 305 may execute software 315 to provide the functionality of BAN multimode controller 365. Additionally, a step or act may be performed by BAN transmitter 355 or BAN receiver 360. With regard to process 600, it may be assumed that a triggering event has occurred to cause a multimode BAN communication to occur.

Process 600 may be performed when multiple BAN communication devices are worn and/or carried by a single user. Additionally, process 600 may be performed according to other environments in which on-body communication between BAN communication devices is performed (e.g., between two users, a user and a BAN communication device not worn or carried by the user, etc.).

Process 600 begins, in block 605, with a signal being transmitted, by a first device in a first frequency mode, to make contact to a second device. For example, BAN multimode controller 365 of a first multimode BAN communication device may receive data indicating to initiate or establish a BAN session. According to an exemplary embodiment, in response to this indication, BAN multimode controller 365 causes BAN transmitter 355 to transmit a low frequency, on-body signal that does not carry data. According to another exemplary embodiment, BAN transmitter 355 transmits a low frequency, on-body signal that carries data.

In block 610, the signal is received by a second device. For example, the low frequency signal propagates as an on-body communication. A second multimode BAN communication device receives the low frequency, on-body signal via BAN receiver 360.

In block 615, the second device, while in a second frequency mode, transmits a signal to contact the first device. For example, in response to receiving the low frequency signal, BAN multimode controller 365 of the second multimode BAN communication device causes BAN transmitter 355 to transmit a high frequency, on-body signal that does not carry data. According to another exemplary embodiment, BAN transmitter 355 transmits a low frequency, on-body signal that carries data.

In block 620, it is determined, by the first device, whether a signal from the second device is received. For example, BAN multimode controller 365 of the first BAN communication device determines whether to continue a BAN communication with the second device based on whether BAN receiver 360 has received a high frequency, on-body signal that is responsive to the previously transmitted low frequency, on-body signal. According to an exemplary implementation, BAN multimode controller 365 may wait a prefigured time window to receive a response.

When it is determined that a signal from the second device is received (block 620-YES), the first device enters a second frequency mode (block 625). For example, when BAN multimode controller 365 determines that a high frequency, on-body signal has been received, BAN multimode controller 365 causes BAN communication system 350 to enter a high BAN communication mode. That is, BAN multimode controller 365 determines to continue the BAN communication with the second device. For example, BAN communication system 350 may transmit and/or receive data in the high BAN communication mode.

When it is determined that a signal is not received from the second device (block 620-NO), the first device does not enter the second frequency mode (block 630). For example, when BAN multimode controller 365 determines that a high frequency, on-body signal has not been received, BAN multimode controller 365 does not cause BAN communication system 350 to enter a high BAN communication mode. For example, BAN multimode controller 365 may determine to discontinue the BAN communication with the second device when the high frequency, on-body signal has not been received. Alternatively, BAN communication system 350 may remain in the low BAN communication mode and attempt another BAN communication (e.g., transmit another low frequency, on-body signal). For example, BAN communication system 350 may wait a preconfigured time period (e.g., a back-off period) before attempting to establish another BAN session.

Although FIG. 6 illustrates an exemplary process 600, according to other embodiments, process 600 may comprise additional operations, fewer operations, and/or different operations than those illustrated in FIG. 6 and described. For example, as previously described, BAN multimode controller 365 may cause BAN communication system 350 to enter the low BAN communication mode subsequent to the BAN session having been established. Thus, for example, in block 505, the first device may transmit a low frequency signal to the second device to verify the on-body connection. Depending on whether the BAN session was established by way of a low frequency signal having been transmitted and whether any previous BAN session verifications occurred, the low frequency signal may or may not be or constitute a "first" or an "initial" low frequency signal. For example, when the BAN session is established by way of transmitting one or multiple high frequency signals and no previous BAN session verifications occurred, than when the first device transmits a low frequency signal, such a signal does constitute the "first" or the "initial" low frequency signal. On the other hand, when the BAN session is established by way of transmitting one or multiple low frequency signals or a previous BAN session verification occurred, than when the first device transmits a low frequency signal, such a signal does not constitute the "first" or the "initial" low frequency signal.

Additionally, process 600 may be performed to ensure that on-body communication is occurring between multiple BAN communication devices, regardless of whether the BAN communication devices are worn or carried by the same user.

The foregoing description of embodiments provides illustration, but is not intended to be exhaustive or to limit implementations to the precise form disclosed. Modifications and variations of the embodiments and/or implementations are possible in light of the above teachings, or may be acquired from practice of the teachings.

An embodiment can also be implemented through computer readable code/instructions stored by a storage medium. A storage medium may comprise one or more of the storage media described above in relation to memory/storage 310. The storage medium may also comprise data and/or information, such as a data file, a data structure, and software, such as a program module, an application, etc. Computer readable code may comprise both machine code, such as produced by a compiler, and files comprising higher level code that may be executed by a computational device using, for example, an interpreter.

The flowcharts and blocks illustrated and described with respect to FIGS. 5 and 6 illustrate exemplary processes according to an exemplary embodiment. However, according to other embodiments, the function(s) or act(s) described with respect to a block or blocks may be performed in an order that is different than the order illustrated and described. For example, two or more blocks may be performed concurrently, substantially concurrently, or in reverse order, depending on, among other things, dependency of a block to another block. As previously described, for example, process 500 and process 600 may be implemented when establishing a BAN session or subsequent to the establishment of the BAN session so as to verify the on-body connection.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

The term "logic" or "component," when used in the specification may include hardware (e.g., processor 305) or a combination of hardware and software (software 315). The embodiments have been described without reference to the specific software code since software can be designed to implement an embodiment based on the description herein and the accompanying drawings.

The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

In the specification and illustrated by the drawings, reference is made to "an exemplary embodiment," "an embodiment," "embodiments," etc., which may include a particular feature, structure or characteristic in connection with an embodiment(s). However, the use of these terms or phrases does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements. Use of the term "on-body" signal is intended to mean a body-coupled signal.

No element, act, or instruction disclosed in the specification should be construed as critical or essential to the embodiments described herein unless explicitly described as such.

What is claimed is:

1. A method comprising:
    transmitting, by a first device operating in a low frequency body area network (BAN) communication mode, a low frequency, on-body signal to a second device, the low frequency, on-body signal comprising a flag indicating that the low frequency, on-body signal is intended as an on-body communication;
    determining, by the first device, whether to continue a BAN communication with the second device based on whether an on-body BAN signal is received from the second device that is responsive to the low frequency, on-body signal; and
    operating, by the first device, in a high frequency BAN communication mode, based on determining that the on-body BAN signal is received, wherein operating in the high frequency BAN communication mode configures the first device to transmit and receive an on-body signal within a frequency band different from a frequency band of the low frequency BAN communication mode.

2. The method of claim 1, wherein the low frequency, on-body signal is an initial signal to establish a BAN session with the second device.

3. The method of claim 1, wherein the transmitting occurs subsequent to an establishment of a BAN session with the second device, and wherein during the BAN session and prior to the first device transmitting the low frequency, on-body signal to the second device, the first device and the second device each is operating in the high frequency BAN communication mode and each of the first device and the second device has transmitted at least one high frequency signal.

4. The method of claim 3, further comprising:
    determining, by the first device, whether to verify an on-body connectivity with the second device pertaining to the BAN session; and wherein the transmitting the low frequency, on-body signal to the second device comprises:
    switching, by the first device, from the high frequency BAN communication mode to the low frequency BAN communication mode based on determining to verify the on-body connectivity with the second device.

5. The method of claim 1, wherein the low frequency BAN communication mode and the high frequency BAN communication mode operate within different transmitter power ranges.

6. The method of claim 1, further comprising:
receiving, by the second device, the low frequency, on-body signal; and
transmitting, by the second device, the on-body BAN signal to the first device, in response to receiving the low frequency, on-body signal from the first device, wherein when transmitting, by the second device, the second device operates in the low frequency BAN communication mode, and wherein the on-body BAN signal is a low frequency, on-body signal.

7. The method of claim 1, further comprising:
receiving, by the second device, the low frequency, on-body signal; and
transmitting, by the second device, the on-body BAN signal to the first device, in response to receiving the low frequency, on-body signal from the first device, wherein when transmitting, by the second device, the second device operates in the high frequency BAN communication mode, and wherein the on-body BAN signal is a high frequency, on-body signal.

8. The method of claim 1, further comprising:
transmitting, by the first device operating in the high frequency BAN communication mode, a high frequency, on-body signal in response to receiving the on-body BAN signal from the second device; and
discontinuing, by the first device, the BAN communication with the second device based on determining that the on-body BAN signal is not received from the second device that is responsive to the low frequency, on-body signal.

9. A device comprising:
a communication interface, wherein the communication interface is configured to operate in a low frequency body area network (BAN) communication mode and a high frequency BAN communication mode;
a memory, wherein the memory stores instructions; and
a processor, wherein the processor is configured to execute the instructions to:
transmit, via the communication interface operating in the low frequency BAN communication mode, a low frequency, on-body signal to another device, the low frequency, on-body signal comprising a flag indicating that the low frequency, on-body signal is intended as an on-body communication;
determine whether to continue a BAN communication with the other device based on whether an on-body BAN signal is received from the other device that is responsive to the low frequency, on-body signal; and
switch the communication interface to the high frequency BAN communication mode based on a determination that the on-body BAN signal is received, wherein the high frequency BAN communication mode configures the communication interface to transmit and receive an on-body signal within a frequency band different from a frequency band of the low frequency BAN communication mode.

10. The device of claim 9, wherein the low frequency, on-body signal is an initial signal to establish a BAN session with the other device.

11. The device of claim 9, wherein a transmission of the low frequency, on-body signal to the other device occurs subsequent to an establishment of a BAN session with the other device, and wherein during the BAN session and prior to the transmission, the communication interface operates in the high frequency BAN communication mode, and wherein the processor is further configured to execute the instructions to:
transmit, via the communication interface operating in the high frequency BAN communication mode, a high frequency, on-body signal to the other device.

12. The device of claim 11, wherein the low frequency BAN communication mode and the high frequency BAN communication mode operate within different transmitter power ranges, and wherein the processor is configured to execute the instructions to:
transmit, via the communication interface operating in the high frequency BAN communication mode, an initial, high frequency, on-body signal to the other device, wherein the initial, high frequency, on-body signal is an initial signal to establish the BAN session.

13. The device of claim 9, wherein the communication interface comprises:
a transmitter;
a receiver; and
switch logic, wherein the switch logic is configured to control when the communication interface operates in the low frequency BAN communication mode and when the communication interface operates in the high frequency BAN communication mode, and wherein the processor is further configured to execute the instructions to:
discontinue the BAN communication with the other device based on a determination that the on-body BAN signal is not received from the other device.

14. The device of claim 9, wherein the on-body BAN signal is a low frequency, on-body signal, and wherein the processor is further configured to execute the instructions to:
receive, via the communication interface operating in the low frequency BAN communication mode, the low frequency, on-body signal, from the other device.

15. The device of claim 9, wherein the on-body BAN signal is a high frequency, on-body signal, and wherein the processor is further configured to execute the instructions to:
receive, via the communication operating in the high frequency BAN communication mode, the high frequency, on-body signal, from the other device.

* * * * *